US011268766B2

(12) United States Patent
Picco et al.

(10) Patent No.: US 11,268,766 B2
(45) Date of Patent: Mar. 8, 2022

(54) PROCESS AND DEVICE FOR MEASURING WEAR OF A REFRACTORY LINING OF A RECEPTACLE INTENDED TO CONTAIN MOLTEN METAL

(71) Applicant: ArcelorMittal, Luxembourg (LU)

(72) Inventors: Marco Picco, Luxembourg (LU); David Glijer, Metz (FR); Daniel Gualtieri, Uckange (FR)

(73) Assignee: ARCELORMITTAL, Luxembourg (LU)

( * ) Notice: Subject to any disclaimer, the term of this patent is extended or adjusted under 35 U.S.C. 154(b) by 251 days.

(21) Appl. No.: 16/465,913

(22) PCT Filed: Dec. 12, 2016

(86) PCT No.: PCT/IB2016/001749
§ 371 (c)(1),
(2) Date: May 31, 2019

(87) PCT Pub. No.: WO2018/109510
PCT Pub. Date: Jun. 21, 2018

(65) Prior Publication Data
US 2020/0072554 A1 Mar. 5, 2020

(51) Int. Cl.
*F27D 19/00* (2006.01)
*F27D 21/00* (2006.01)
(Continued)

(52) U.S. Cl.
CPC ......... *F27D 19/00* (2013.01); *F27D 21/0014* (2013.01); *F27B 3/085* (2013.01);
(Continued)

(58) Field of Classification Search
CPC ........ F27B 9/40; F27D 19/00; F27D 21/0021; F27D 21/0014
(Continued)

(56) References Cited

U.S. PATENT DOCUMENTS 4,025,192 A 5/1977 Scholdstrom et al.
4,110,617 A * 8/1978 Legille .................... G01C 7/00 250/342
(Continued)

FOREIGN PATENT DOCUMENTS

CN 104422387 A 3/2015
EP 0310244 A2 9/1989
(Continued)

OTHER PUBLICATIONS

The International Search Report issued in connection with International application No. PCT/IB2016/001749 dated Jun. 16, 2017.

*Primary Examiner* — Jessee R Roe
*Assistant Examiner* — Michael Aboagye
(74) *Attorney, Agent, or Firm* — Davidson, Davidson & Kappel, LLC

(57) ABSTRACT

A process for measuring wear of a refractory lining of a receptacle intended to contain molten metal, containing the following steps:
- scanning a first surface of the refractory lining using a first laser scanner in order to obtain a first initial set of data representative of the first surface,
- scanning a second surface of the refractory lining using a second laser scanner, distinct from the first laser scanner, in order to obtain a second initial set of data representative of the second surface, wherein the second surface includes a grey zone for the first laser scanner, the receptacle defining an obstacle located between the first laser scanner and the grey zone during scanning by the first laser scanner, and
- calculating a final set of data using the first initial set of data and the second initial set of data, the final set of data being representative of a surface of the refractory lining including the first surface and the second surface.

8 Claims, 7 Drawing Sheets

(51) Int. Cl.
*F27B 3/08* (2006.01)
*F27B 9/40* (2006.01)

(52) U.S. Cl.
CPC ............ *F27B 9/40* (2013.01); *F27D 21/0021* (2013.01); *F27D 2019/0003* (2013.01)

(58) Field of Classification Search
USPC ....... 266/44, 99, 280, 281, 90, 275, 236, 45, 266/80; 356/601, 602, 630, 631, 609
See application file for complete search history.

(56) References Cited

U.S. PATENT DOCUMENTS

| | | | | |
|---|---|---|---|---|
| 4,893,933 | A * | 1/1990 | Neiheisel | C21C 5/4673 356/608 |
| 5,212,738 | A * | 5/1993 | Chande | C21C 5/441 348/135 |
| 5,706,090 | A | 1/1998 | Jokinen | |
| 6,922,251 | B1 * | 7/2005 | Kirchhoff | C21C 5/44 356/601 |
| 7,924,438 | B2 * | 4/2011 | Kleinloh | G01S 5/16 356/601 |
| 8,345,266 | B2 * | 1/2013 | Brzoska | G01B 11/24 356/608 |
| 2009/0237678 | A1 | 9/2009 | Brzoska et al. | |
| 2009/0303494 | A1 | 12/2009 | Kleinloh | |
| 2010/0158361 | A1 | 6/2010 | Grafinger et al. | |
| 2014/0140176 | A1 | 5/2014 | Dresen et al. | |
| 2016/0273907 | A1 | 9/2016 | Bonin et al. | |

FOREIGN PATENT DOCUMENTS

| | | | |
|---|---|---|---|
| EP | 0661518 | A2 | 7/1995 |
| EP | 1167919 | A1 | 1/2002 |
| JP | S6355444 | A | 3/1988 |
| JP | H04203905 | A | 7/1992 |
| JP | H09235606 | A | 9/1997 |
| JP | 2009518628 | A | 5/2009 |
| JP | 2014032115 | A | 2/2014 |
| JP | 2016006419 | A | 1/2016 |
| RU | 70514 | U1 | 1/2008 |
| WO | WO0055575 | A1 | 9/2000 |
| WO | WO03081157 | A1 | 10/2003 |

* cited by examiner

PROCESS AND DEVICE FOR MEASURING WEAR OF A REFRACTORY LINING OF A RECEPTACLE INTENDED TO CONTAIN MOLTEN METAL

FIELD OF THE INVENTION

The present invention relates to a process for measuring wear of a refractory lining of a receptacle intended to contain molten steel, in particular a ladle, an electric arc furnace (hereafter EAF) or a converter.

The invention also relates to a corresponding installation comprising the receptacle.

BACKGROUND

Receptacles such as a ladle and an EAF include a refractory lining acting as a protection against high temperatures when the receptacle contains molten steel. However, the refractory lining is subject to wear or deposits coming from the molten steel.

Controlling the refractory lining plays an important role in order to achieve continuous and safe operation of the receptacle. Performing a visual check of the receptacle, when empty, has been the most common way to control the condition of the refractory lining and how it evolves.

However, this method has proven somewhat difficult, due to the environment of the receptacle in terms of dust and temperature, and non-quantitative.

In order to make the control quantitative, U.S. Pat. No. 6,922,251 B1 discloses using a laser scanner having a laser beam emitter, a mirror for deflecting the laser beam, and a laser beam receiver for receiving a laser beam reflected by the surface of the refractory lining. The transit time between emission and reception of the laser beam by the laser scanner provides a distance between the refractory lining and the laser scanner in the direction of the emitted laser beam. This provides the position of one point of the surface of the refractory lining with respect to the laser scanner.

Rotating the mirror about a first rotation axis and the laser scanner itself about a second rotation axis allows scanning the refractory lining in two mutually perpendicular directions, so as to obtain a plurality of points representing the scanned surface. This will be referred to as a “3D image” of the surface. By comparing successive images of the surface, it is possible to determine which parts of the refractory lining have worn off, or grown due to deposits, as the laser scanner is quite accurate.

However, due to the shape of the receptacle, internal geometrical constraints of the receptacle, and the fact that the laser scanner cannot be too close to a receptacle that is still hot, the laser scanner usually does not allow obtaining a full view of the surface of interest. For example, during use of a ladle, a slag rim tends to form along the opening of the ladle. This slag rim creates a shadow zone which hides areas of the interior surface of the ladle located directly beneath it to a scanner scanning the interior of the ladle from above.

In order to overcome this issue, the laser scanner is successively moved in different locations, from where it provides several 3D images. These 3D images are then merged into a global “image”. Merging the successive 3D images requires very accurate knowledge of the successive locations of the laser scanner. This makes the whole process complex and the global image not so accurate, especially for a differential analysis over time such as wear control.

SUMMARY OF THE INVENTION

An object of various embodiments of the present invention is to provide a process for measuring wear of the refractory lining in a more accurate way.

The present invention provides a process for measuring wear of a refractory lining of a receptacle intended to contain molten metal, the process comprising the following steps:

- scanning a first surface of the refractory lining using a first laser scanner in order to obtain a first initial set of data representative of the first surface,
- scanning a second surface of the refractory lining using a second laser scanner, distinct from the first laser scanner, in order to obtain a second initial set of data representative of the second surface, wherein the second surface includes a grey zone for the first laser scanner, the receptacle defining an obstacle located between the first laser scanner and the grey zone during scanning by the first laser scanner, and
- calculating a final set of data using the first initial set of data and the second initial set of data, the final set of data being representative of a surface of the refractory lining including the first surface and the second surface.

In certain embodiments, the process comprises one or more of the following feature(s), taken in isolation or any technical feasible combination:

- the receptacle is a ladle, an electric arc furnace or a converter;
- scanning of the first surface and scanning of the second surface are simultaneous;
- the process comprises fixing a base of the first laser scanner and a base of the second laser scanner on a support frame, wherein the bases are fixedly spaced apart along a transverse direction of the support frame; and keeping the support frame in the same fixed position with respect to the receptacle during scanning of the first surface and the second surface;
- scanning of the first surface and of the second surface comprises: emitting a laser beam using a laser beam emitter; receiving a reflected laser beam from the refractory lining using a laser beam receiver; measuring a transit time between emission of the laser beam and reception of the reflected laser beam; and deflecting the emitted laser beam in two mutually perpendicular directions;
- deflecting the emitted laser beam includes rotating a mirror about a first rotation axis with respect to the laser beam emitter, and rotating the laser beam emitter about a second rotation axis with respect to the base;
- calculating the final set of data includes using parameters representative of a position of the base of the second laser scanner with respect to the base of the first laser scanner; and
- calculating the final set of data includes detecting at least three points within the first initial set of data and three other points within the second initial set of data, the three points and the other three points being representative of three landmarks within or around the surface.

The invention also provides an installation comprising:

- a receptacle intended to contain molten metal, the receptacle having a refractory lining, and
- a device for measuring wear of a refractory lining of a receptacle intended to contain molten metal, the device comprising:
  - a support frame,
  - a first laser scanner and a second laser scanner both supported by the support frame, spaced apart along a transverse direction of the support frame, and adapted to respectively scan a first surface and a second surface of the refractory lining for providing a first initial set of data representative of the first surface, and a second initial set of data representative of the second surface, wherein the second surface includes a grey zone for the first laser scanner, the receptacle defining an obstacle located between the first laser scanner and the grey zone, and a computer configured to produce a final set of data using the first initial set of data and the second initial set of data, the final set of data being representative of a surface of refractory lining.

In certain embodiments, the installation comprises one or several of the following feature(s), taken in isolation or any technical feasible combination:

each of the first laser scanner and the second laser scanner comprises: a base fixed on the support frame; a laser beam emitter for emitting a laser beam; a laser beam receiver for receiving a reflected laser beam from the refractory lining; a time measurement system to measure a transit time between emission of the laser beam and reception of the reflected laser beam; and a deflector for deflecting the emitted laser beam, the deflector comprising a mirror rotatable about a first rotation axis with respect to the laser beam emitter, and a unit configured to rotate the laser beam emitter about a second rotation axis with respect to the base;

the second rotation axes of the first laser scanner and the second laser scanner are substantially perpendicular to the transverse direction, and preferably parallel to each other;

the computer is adapted for: detecting at least three points within the first initial set of data and three other points within the second initial set of data, the three points and the three other points being representative of three landmarks within or around said surface of the refractory lining; or calculating the final set of data using parameters representative of a position of the base of the second laser scanner with respect to the base of the first laser scanner;

the support frame includes a box having a main part defining at least one opening and a closing system movable with respect to the main part between an open position and a closed position, the first laser scanner and the second laser scanner being located in the box for scanning the refractory lining through the opening when the closing system is in the open position, the box being preferably water-tight and protected from dust when the closing system is in the closed position;

the installation further comprises one or more heat protection systems selected from the group comprising: an internal protective screen located within the box and defining at least two scanning windows narrower than the opening along the transverse direction; a cover rotatably mounted on the main part of the box, forming the closing system and having an external protective panel adapted to reflect at least 80% of thermal radiations coming from the receptacle when the closing system is in the closed position; a rear face of the box comprising fins directed outwardly in order to favor a thermal exchange between the box and the surrounding atmosphere, and optionally at least one fan fixed to the rear face and adapted to blow or extract air on or from the fins; and a source of compressed air and at least two nozzle connected to said source of compressed air and adapted to blow air from the source of compressed air towards the first laser scanner and the second laser scanner; and the installation further comprises a base, and an arm holding the box and fixed to the base, the arm being preferably mounted rotatable on the base between a first position, in which the arm is intended to be vertical, and a second position, in which the arm is intended to be horizontal.

BRIEF DESCRIPTION OF THE DRAWINGS

Other features and advantages of the invention will appear upon reading the following description, given by way of example and with reference to the accompanying drawings, in which:

FIG. 5 is a schematic view of the images provided by the laser scanners shown in

FIG. 3,

DETAILED DESCRIPTION

A process according to the invention will now be described with reference to FIGS. 1 to 5.

Figure 1:
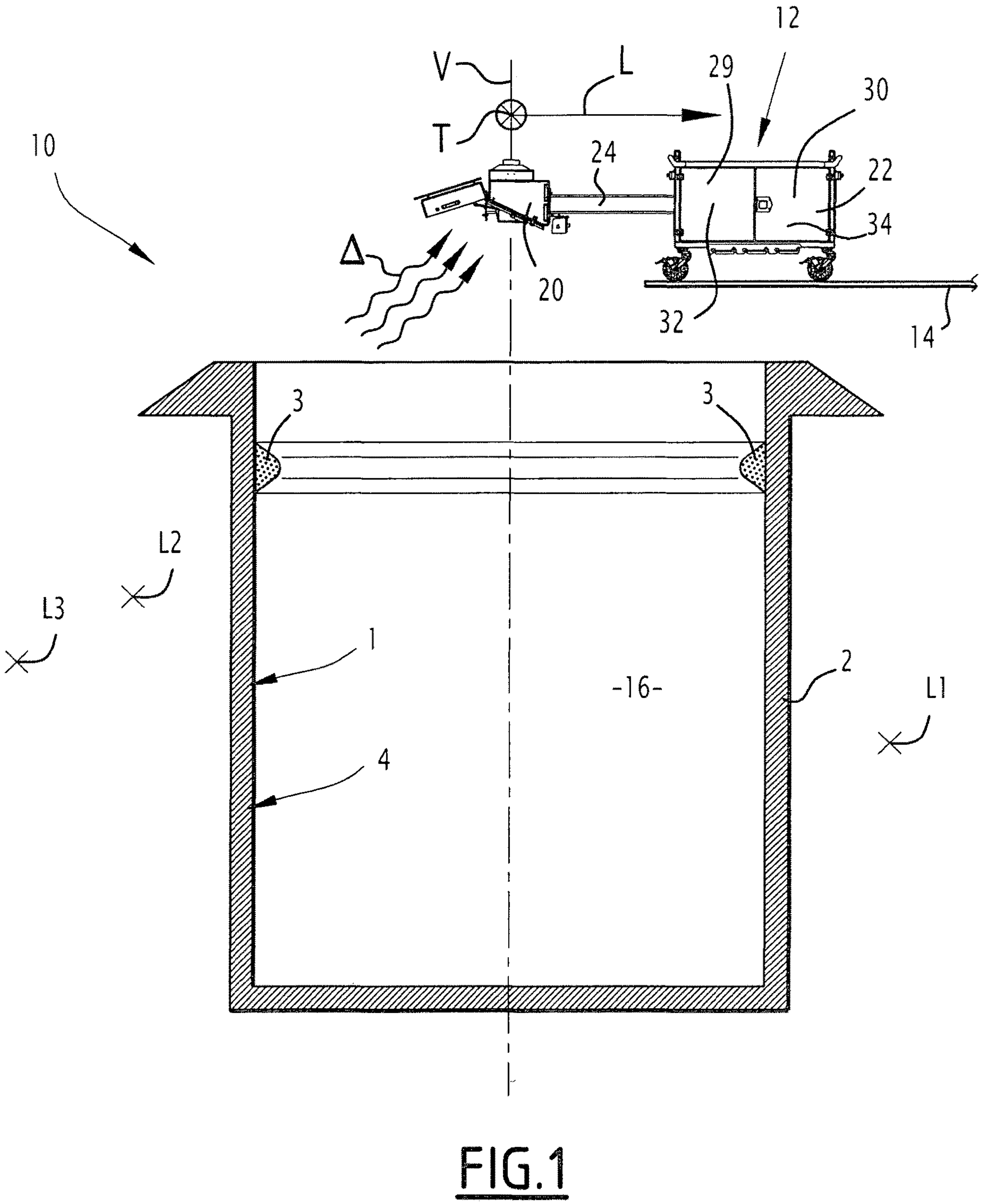
FIG. 1 is a schematic side view of an installation according to a first embodiment of the invention.
Figure 2:
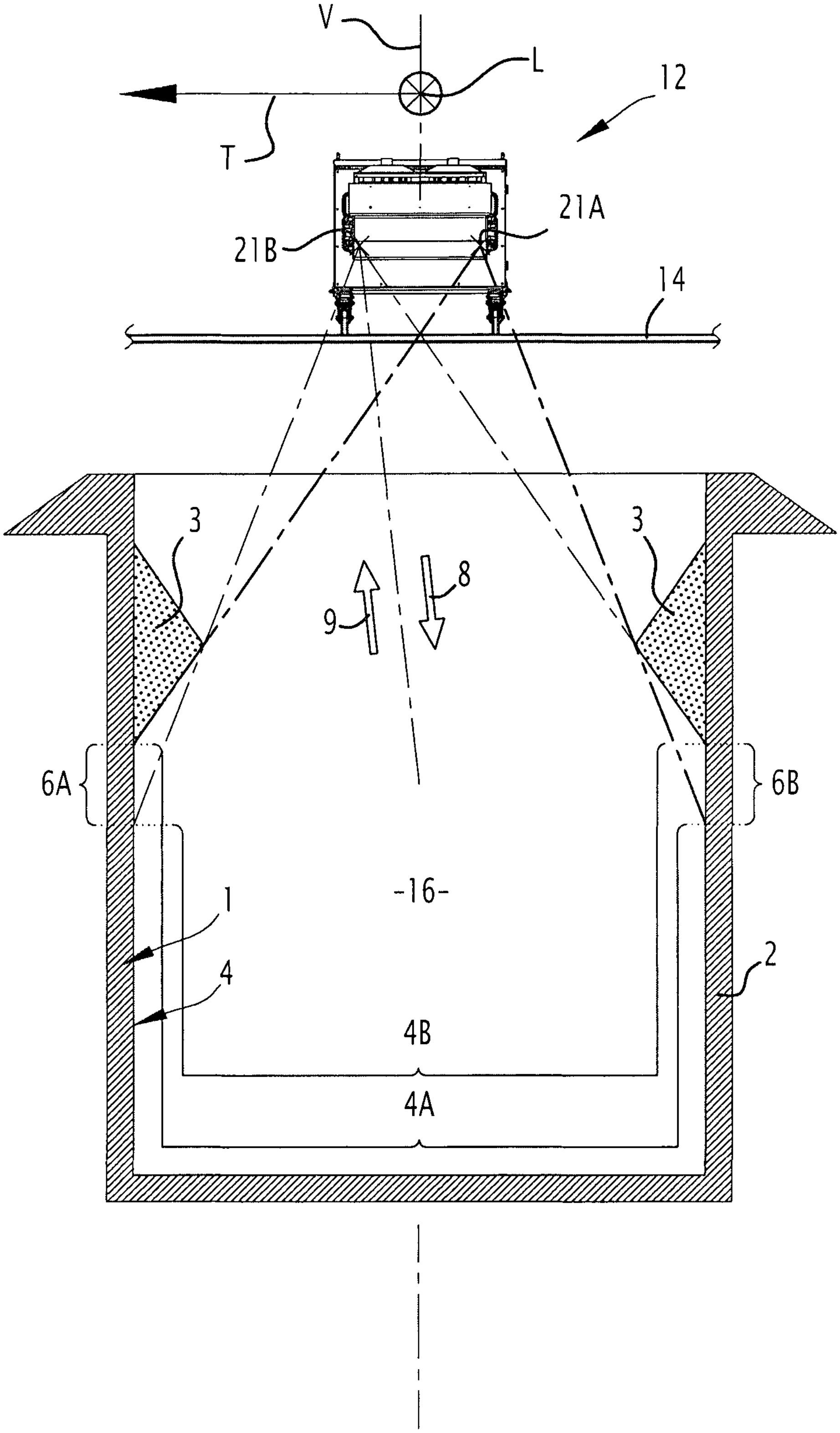
FIG. 2 is another schematic side view of the installation shown in FIG. 1.

An objective is to measure wear of a refractory lining 1 of a receptacle 2 shown in FIGS. 1 and 2. The receptacle 2 is, for example, a ladle intended to contain molten metal. As a variant, the receptacle 2 is an EAF (shown in FIG. 7) or a converter.

The refractory lining 1 is adapted to protect the receptacle 2 from high temperatures of the molten metal. After emptying the receptacle 2, a deposit 3 (FIG. 2) may be left, for example where the free surface of the molten metal was when the receptacle was filled.

The process comprises scanning a first surface 4A of the refractory lining 1 using a first laser scanner 21A in order to obtain a first initial set of data 5A (FIG. 5) representative of the first surface of the refractory lining, and scanning a second surface 4B of the refractory lining using a second laser scanner 21B, distinct from the first laser scanner, in order to obtain a second initial set of data 5B (FIG. 5) representative of the second surface of the refractory lining.

The second surface 4B includes a grey zone 6B for the first laser scanner 21A, as the deposit 3 forms an obstacle located between the first laser scanner and the grey zone 6B during scanning by the first laser scanner. In the shown example, similarly, the first surface 4A includes a grey zone 6A for the second laser scanner 21B, as the deposit 3 also forms an obstacle located between the second laser scanner and the grey zone 6A during scanning by the second laser scanner.

The process also comprises calculating a final set of data 7 using the first initial set of data 5A and the second initial set of data 5B. The final set of data 7 is representative of a surface 4 of the refractory lining 1 including the first surface 4A and the second surface 4B. The surface 4 is for example the sum of the first surface 4A and the second surface 4B.

The initial set of data 5A is a 3D (three dimensional) image of the first surface 4A in which the grey zone 6A is not visible (not present), and the second initial set of data 5B is a 3D image of the second surface 4B in which the grey zone 6B is not visible.

Using at least two laser scanners and merging their measurements makes is possible to obtain the final set of data 7 that is a 3D image of the whole surface 4, as the second laser scanner 21B has a different view angle on the refractory lining 1 than the first laser scanner 21A.

The final set of data 7 provides information allowing to measure wear of the refractory lining 1. The final set of data 7 is for example compared with a reference set, such as a previous 3D image representative of the surface 4. Comparison enables to detect zones where the surface 4 has worn-off, and zones where deposits have occurred.

Moreover, the part of the surface 4 which does not belong to the grey zones 6A and 6B is scanned at least twice, which allows either improving the resolution of the final set of data 7, or obtaining the final set of data more rapidly than with a single laser scanner.

Scanning of the first surface 4A and scanning of the second surface 4B are advantageously simultaneous, which allows saving time and reducing the duration of the exposure of the laser scanners 21A, 21B to a hot and dusty environment.

The process may comprise fixing bases 104 of the first laser scanner 21A and the second laser scanner 21B (FIGS. 3 and 4) on a support frame 68, the bases being fixedly spaced apart along a transverse direction T of the support frame, and keeping the support frame in a same fixed position with respect to the receptacle 2 during scanning of the first surface 4A and the second surface 4B. By doing so, the relative position of the second laser scanner 21B with respect to the first laser scanner 21A is known and predetermined.

In other embodiments, other techniques for keeping the first laser scanner 21A and the second laser scanner 21B in fixed positions relative to the receptacle 2 may be used. For example, the first laser scanner 21A and the second laser scanner 21B may be mounted on separate support frames.

Scanning of the first surface 4A and of the second surface 4B is advantageously performed in the same manner, so the first one will be explained in detail hereafter.

Scanning of the first surface 4A for example comprises emitting a laser beam 8 (FIG. 2) using a laser beam emitter E (FIG. 4), receiving a reflected laser beam 9 from the refractory lining 1 using a laser beam receiver R, measuring a transit time between emission of the laser beam and reception of the reflected laser beam, and deflecting the emitted laser beam in two mutually perpendicular directions A, B.

Deflecting the emitted laser beam 8 may be performed by rotating a mirror M (FIG. 4) about a first rotation axis A with respect to the laser beam emitter E, and rotating the laser beam emitter about a second rotation axis B with respect to the base 104.

Calculating the final set of data 7 is for example performed using parameters representative of a position of the base 104 of the second laser scanner 21B with respect to the base 104 of the first laser scanner 21A. Said parameters are used to perform one or several change(s) of coordinates so enabling to add up the first initial set of data 5A and the second initial set of data 5B expressed in a same coordinate system in order to obtain the final set of data 7.

According to another embodiment, calculating the final set of data 7 includes detecting at least three points P1, P2, P3 (FIG. 5) within the first initial set of data 5A and three points P1', P2', P3' within the second initial set of data 5B. The three points P1, P2, P3 and the three points P1', P2', P3' are representative of three landmarks L1, L2, L3 located within or around the first surface 4A and the second surface 4B.

Figure 5:
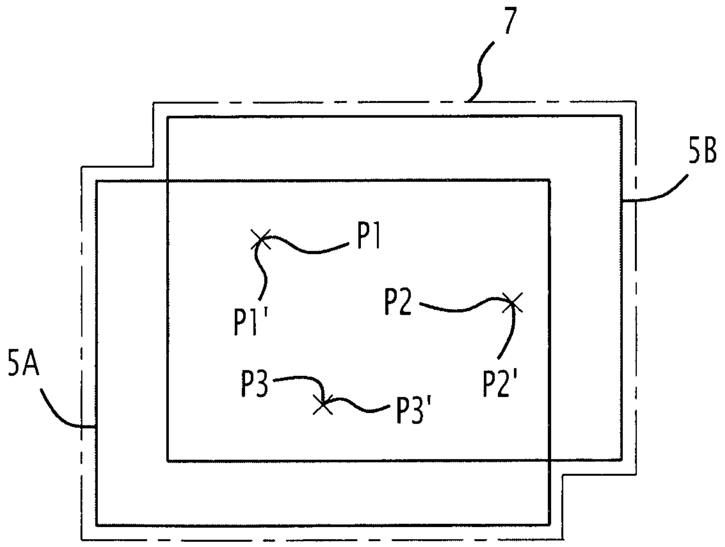

The final set of data 7 is calculated so that the three points P1, P2, P3 and P1', P2', P3' are superposed as shown in FIG. 5.

With reference to FIGS. 1 and 2, an installation 10 according to a first embodiment of the invention is described.

The installation 10 comprises the receptacle 2, a device 12 for measuring wear of the refractory lining, and a floor 14 on which the device stands.

The receptacle 2 is for example a steel ladle intended to contain molten steel, for example coming from an electric arc furnace. The ladle is approximately symmetrical around a vertical direction V. The ladle defines a volume 16 for receiving molten steel, and for example has the deposit 3 around its mouth.

The device 12 comprises a box 20, the two laser scanners 21A, 21B located within the box, a base 22, and an arm 24 holding the box and protruding from the base along a longitudinal direction L approximately horizontal.

The box 20 is located above the ladle in this example in this example.

The base 22 is advantageously adapted to roll on the ground 14.

The base 22 includes a computer 29, optionally a control unit 30 with one or several control screens, a source of compressed air 32, and a power source 34. The base 22 is advantageously equipped with one or several cooling fans having dust filters.

In certain embodiments, the control unit 30 is replaced by a remote control unit.

The base 22 and the arm 24 are advantageously covered with a protective mat, notably on sides facing the receptacle 2. For example the mat comprises an aluminised glass fabric or any insulating material.

The power source 34 advantageously allows the device 12 to be autonomous in terms of power supply. The power source 34 is for example an inverter.

In certain embodiments, the power source 34 is replaced by a connection to an electricity grid.

The source of compressed air 32 is for example a cylinder.

The computer 29 is suitable for monitoring the laser scanners 21A, 21B.

Advantageously, the computer 29 includes one or several dedicated software(s) for analysing the measurements performed by the laser scanners 21A, 21B and for producing the final set of data 7.

In certain embodiments, the computer 29 is remote from the base 22.

Figure 3:
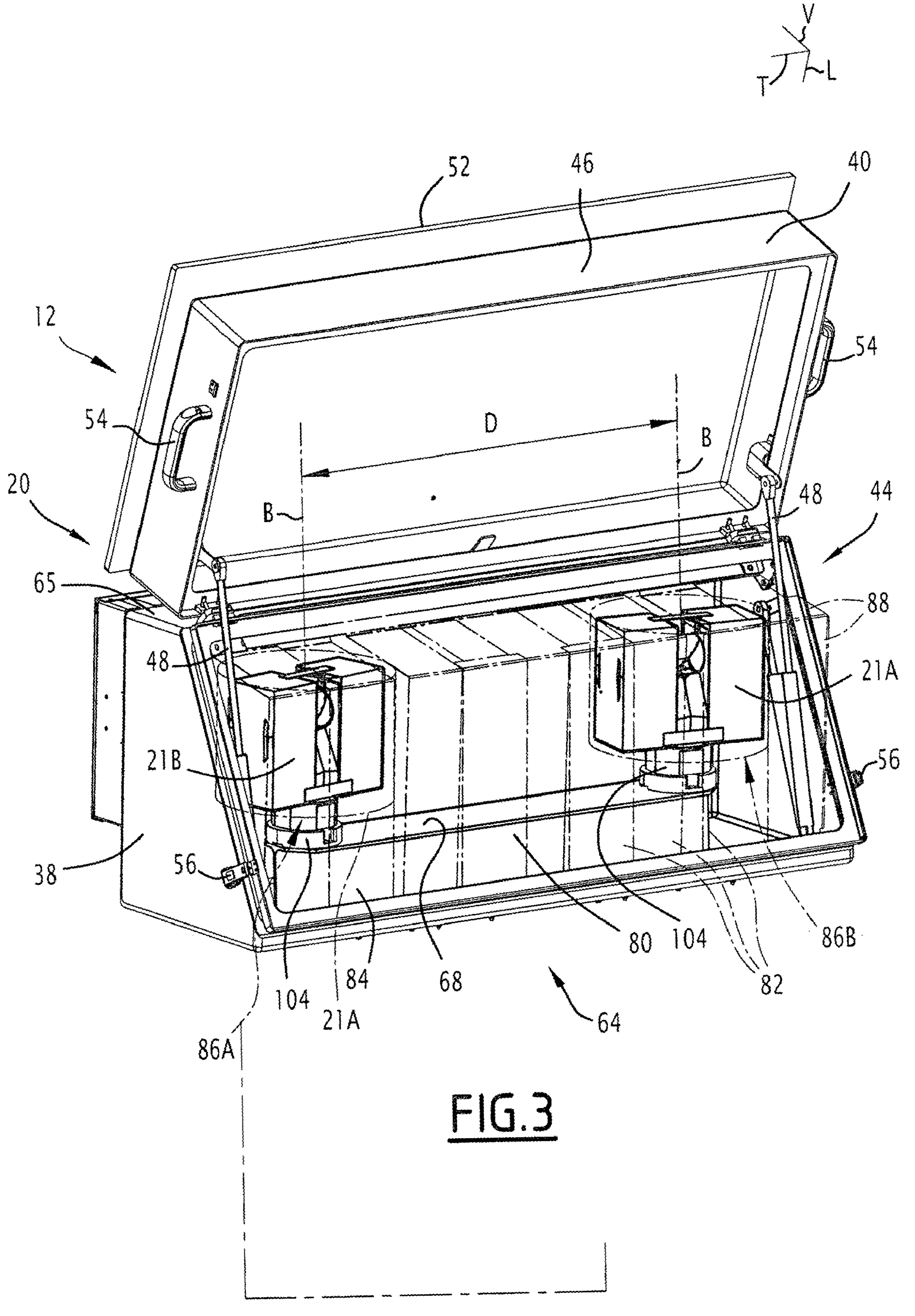
FIG. 3 is a schematic view towards the front face of the box shown in FIGS. 1 and 2.
Figure 6:
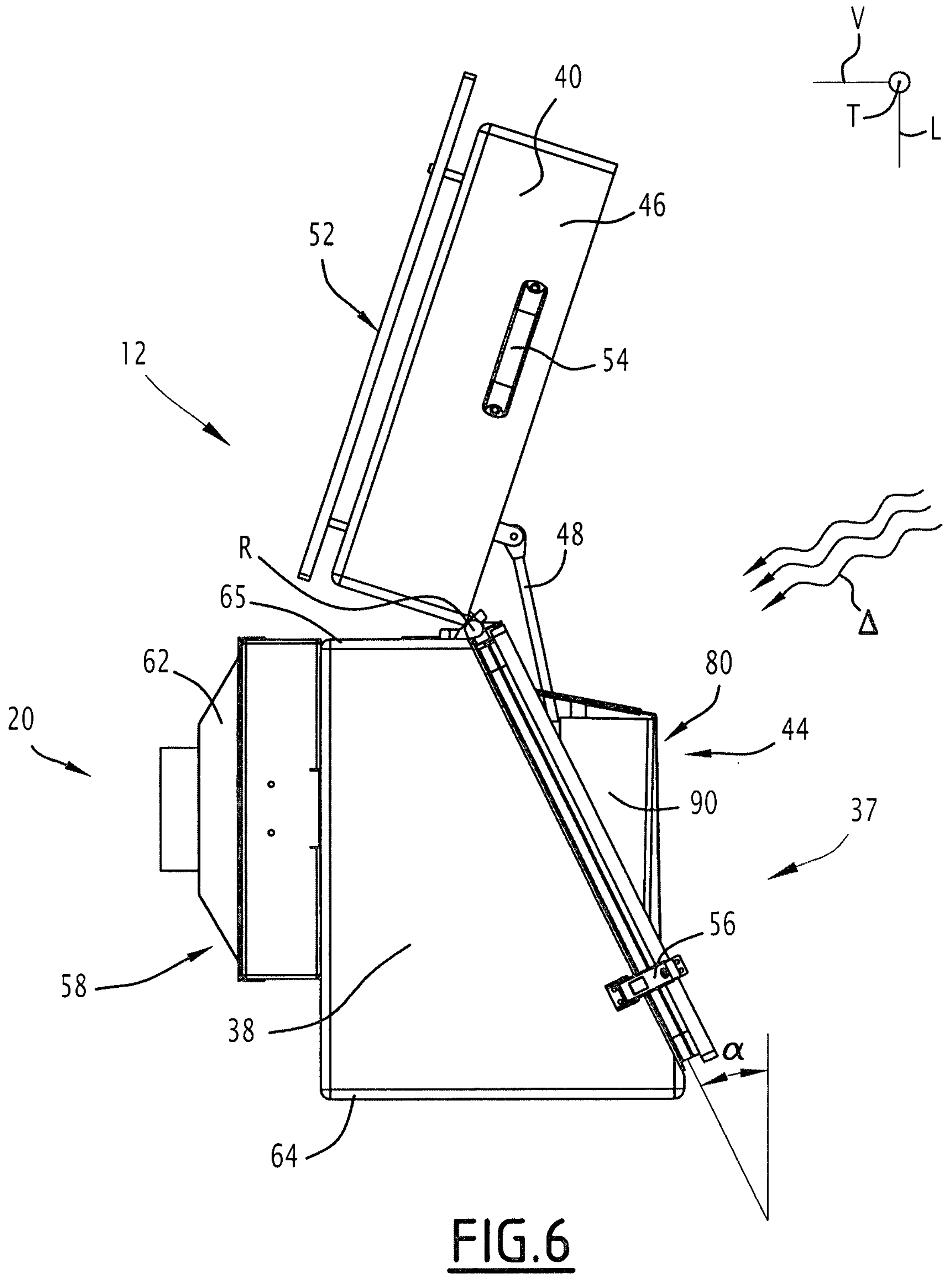
FIG. 6 is another side view of the box shown in FIGS. 1 to 4.

With reference to FIGS. 3 and 6, the box 20 has a front face 37 facing the opening of the ladle downwards. The box 20 also comprises a main part 38 fixed to the arm 24, and a closing system 40 movable with respect to the main part between a closed position, wherein the box is closed around the laser scanners 21A, 21B, and an open position (FIGS. 3 and 6), wherein the main part 38 defines at least one opening 44 in the front face 37.

In a particular embodiment, the box 20 is rotatably mounted on the base 22 around the longitudinal direction L.

When the closing system 40 is in the closed position, the interior of the box 20 is protected against dust, and from water projections from all directions.

The opening 44 extends along the longitudinal direction L and along the transverse direction T, which is perpendicular to the longitudinal direction and for example horizontal.

For example, the opening 44 has a planar, advantageously rectangular, shape. The opening 44 is advantageously parallel to the transverse direction T and for examples defines an angle α (FIG. 6) with the longitudinal direction L ranging between 45° and 80°.

Figure 4:
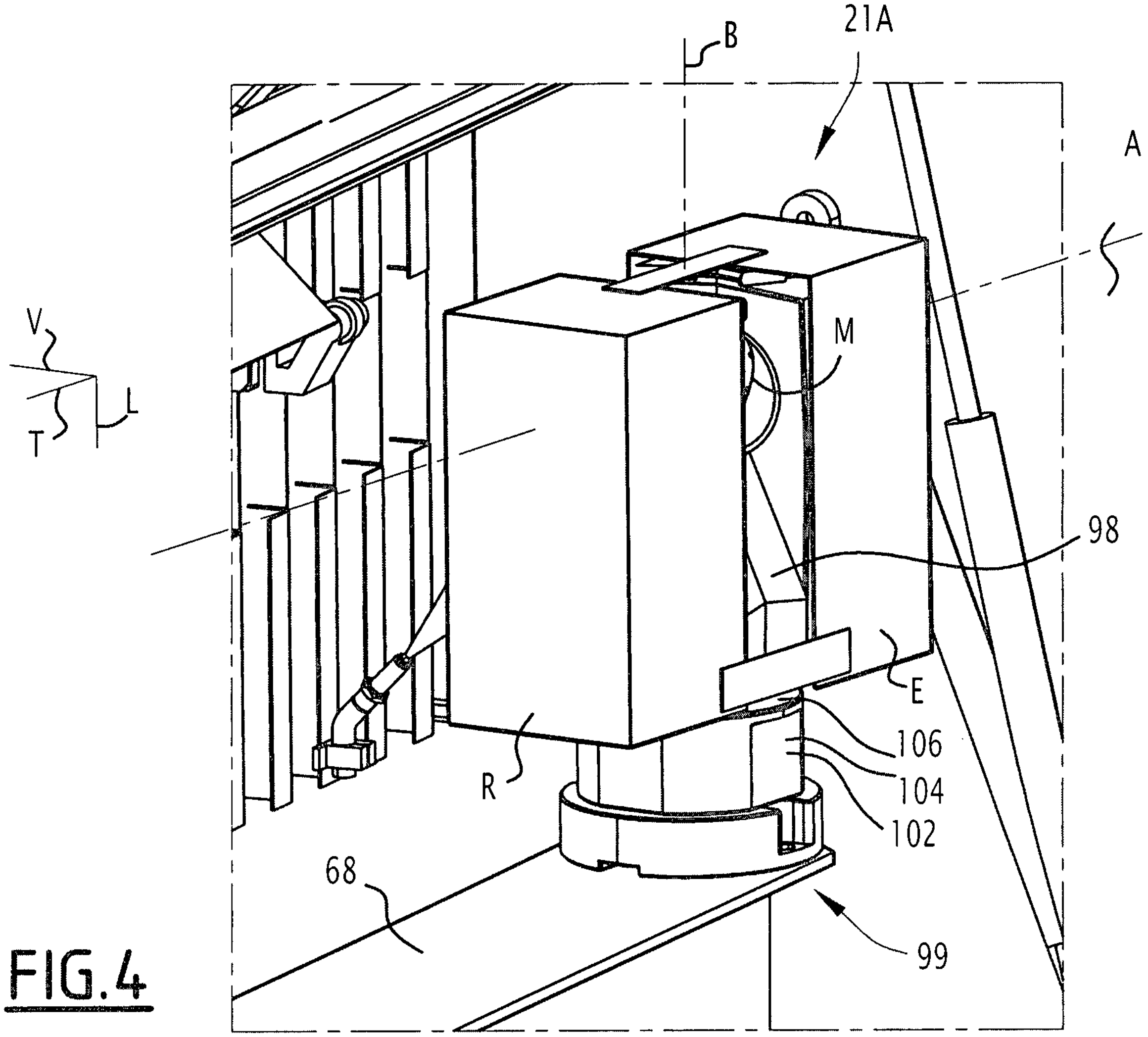
FIG. 4 is a side view of the box shown in FIGS. 1 to 3.

The closing system 40 comprises a cover 46 rotatably mounted on the main part 38 around an axis R (FIG. 6), and for example one or two gas springs 48 adapted to hold the cover in the open position as shown in FIGS. 4 and 6.

The closing system 40 advantageously includes a seal in fluoroelastomer installed between the cover 46 and the main part 38. Fluoroelastomer is a fluorocarbon-based synthetic rubber able to withstand a range of temperatures from −20° C. to 200° C.

In certain embodiments, the seal includes a coating adapted for conducting heat towards the rear of the device 12, and for reflecting thermal radiations Δ from the receptacle 2.

By "adapted to reflect thermal radiations from the receptacle", in the present application, it is meant that the laser scanners 21A, 21B are protected from the thermal radiations emitted by the receptacle 2. The axis R is for example approximately parallel to the transverse direction T.

The cover 46 advantageously comprises an external protective panel 52 adapted to reflect thermal radiations Δ coming from the receptacle 2 when the closing system 40 is in the closed position.

In one embodiment, the cover 46 is adapted to be manually moved in order to move the closing system 40 from the closed position to the open position, and vice versa. To that end, the cover 46 advantageously comprises handles 54 and fasteners 56, for example hook clamps. In another embodiment, the cover 46 is automatically controlled.

The protective panel 52 is, for example, made of reflective metal, such as stainless steel, polished stainless steel, aluminum or polished aluminum and may contain an insulating material such as ceramic fiber. The external protective panel 52 is advantageously spaced apart from the rest of the cover 46, as best seen on FIG. 6.

The main part 38 of the box 20 has a rear face 58 (FIG. 6) opposite the front face 37 with respect to the receptacle 2, advantageous having fins 60 directed outwardly in order to favor a thermal exchange between the box and the surrounding atmosphere.

In a particular embodiment, two fans 62 are fixed to the rear face 58 and adapted to blow or extract air on the fins 60 to increase cooling of the fins 60.

The main part 38 also has a bottom wall 64, for example substantially flat, and advantageously forming a connection interface for mechanically connecting the box 20 and the arm 24. The main part 38 has an upper wall 65.

The main part 38 comprises the support frame 68, for example fixed to the bottom wall 64 towards the interior of the box 20, and extending transversely.

The main part 38 advantageously includes two nozzles 78 (FIG. 4) connected to the source of compressed air 32 for blowing compressed air respectively towards the laser scanners 21A, 21B.

The device 12 optionally includes an internal protective screen 80 adapted to reflect at least 80% of the energy of the thermal radiations Δ coming from the receptacle 2 through the opening 44 of the front face 37.

The internal protective screen 80, for example, comprises several modules 82 distributed along the transverse direction T, and optionally a transverse module 84 adapted to protect the support frame 68 from the thermal radiations 4.

The transverse module 84 is interposed between the support frame 68 and the receptacle 2. The transverse module 84 extends transversely across the opening 44.

Each module 82 is adapted to reflect at least 70% of the energy of the thermal radiations Δ coming from the receptacle 2.

The modules 82 are advantageously fixed to the lower wall 64 and the upper wall 65 of the main part 38, so as to be easily movable by an operator along the transverse direction T in order to define two scanning windows 86A, 86B respectively in front of the laser scanners 21A, 21B.

For example, each module 82 has an "L" shape along the transverse direction T. Each module 82 comprises two panels 88 forming the "L". One of the panels 88 is for example approximately perpendicular to the longitudinal direction L, and the other one is approximately perpendicular to the vertical direction V. The panels 88 are adapted to reflect thermal radiations Δ coming from the receptacle 2 substantially radially with respect to the transverse direction T through the opening 44.

Advantageously, the modules 82 and the transverse module 84 comprise at least 50% in weight of polished aluminum.

Several washers, for example those known as "Delrin washers", are interposed between the support frame 68 and the lower wall 64 in order to limit thermal conduction.

The laser scanners 21A, 21B are mounted on the support frame 68. They are spaced apart along the transverse direction T.

The laser scanners 21A, 21B are for example Focus3D laser scanners commercially available from Faro, or similar ones. The laser scanners 21A, 21B are advantageously protected with reflective adhesive tape stuck to their walls. The adhesive tape is advantageously in aluminised glass fabric, for example the one referenced 363 by the company 3M.

The laser scanners 21A, 21B are adapted to be monitored by the computer 29.

They are advantageously analogous, so only the laser scanner 21A will be described in detail hereafter. The laser scanner 21B is equivalent to the laser scanner 21A translated along the transverse direction T.

The laser scanner 21A comprises the laser beam emitter E and the laser beam receiver R (FIG. 4). The laser scanner 21A also comprises a time measurement system 98 to measure the transit time between emission of the laser beam 8 and reception of the reflected laser beam 9, and a deflector 100 for deflecting the laser beam 8 in the two mutually perpendicular directions A, B.

The deflector 100 includes the mirror M which is rotatable about the first rotation axis A with respect to the laser beam emitter E, and a unit 102 configured to rotate the laser beam emitter E about the second rotation axis B with respect to the support frame 68.

The unit 102 comprises the base 104 mounted on the support frame 68, and a rotary part 106 rigidly fixed to the laser beam emitter E and the laser beam receiver R.

The rotary part 106 rotates about the second rotation axis B and makes the laser beam emitter E, the laser beam receiver R and the mirror M rotate about the second axis B.

The second axis B is for example perpendicular to the transverse direction T and advantageously horizontal in the example. The second axis B of the first laser scanner 21B is parallel to the second axis B of the second laser scanner 21B, and separated by a distance D which is fixed during scanning.

The first axis A is perpendicular to the second axis B and rotates about the second axis B with respect to the support frame 68. When the laser scanners 21A, 21B are idle, the first axis A is for example parallel to the transverse direction T.

The arm 24 is configured so that the laser scanners 21A, 21B are off-centred (FIG. 2) along the transverse direction T with respect to the ladle symmetry axis.

According to a particular embodiment, the length of the arm 24 is adjustable.

Advantageously, the arm 24 is rotatable with respect to the base 22 between a first position (FIG. 1) in which the arm is approximately horizontal, and a second position (FIG. 6) in which the arm is approximately vertical.

A way of using the installation 10 will now be described.

The ladle, previously emptied, and the device 12 are brought into the relative position shown in FIGS. 1 and 2. For example, the device 12 occupies a fixed position on the floor 14 and the ladle is brought under the device, the ladle being in a vertical position.

When the laser 21A and 21B are idle, the closing system 40 is advantageously in the closed position, so as to be protected from dust and heat radiating from the ladle.

The optional heat protection systems, such as the internal protective screen 80, the protective panel 52, the structure of the rear face 58 and the fans 62, and the compressed air blowing nozzles 78 further protect the laser scanners 21A, 21B.

In order to scan the refractory lining 1, the closing system 40 is put in the open position.

The laser scanners 21A, 21B advantageously work simultaneously in order to reduce their exposure time to dust and heat. Scanning is performed as explained above.

When scanning is over, the closing system 40 is put in the closed position.

Figure 7:
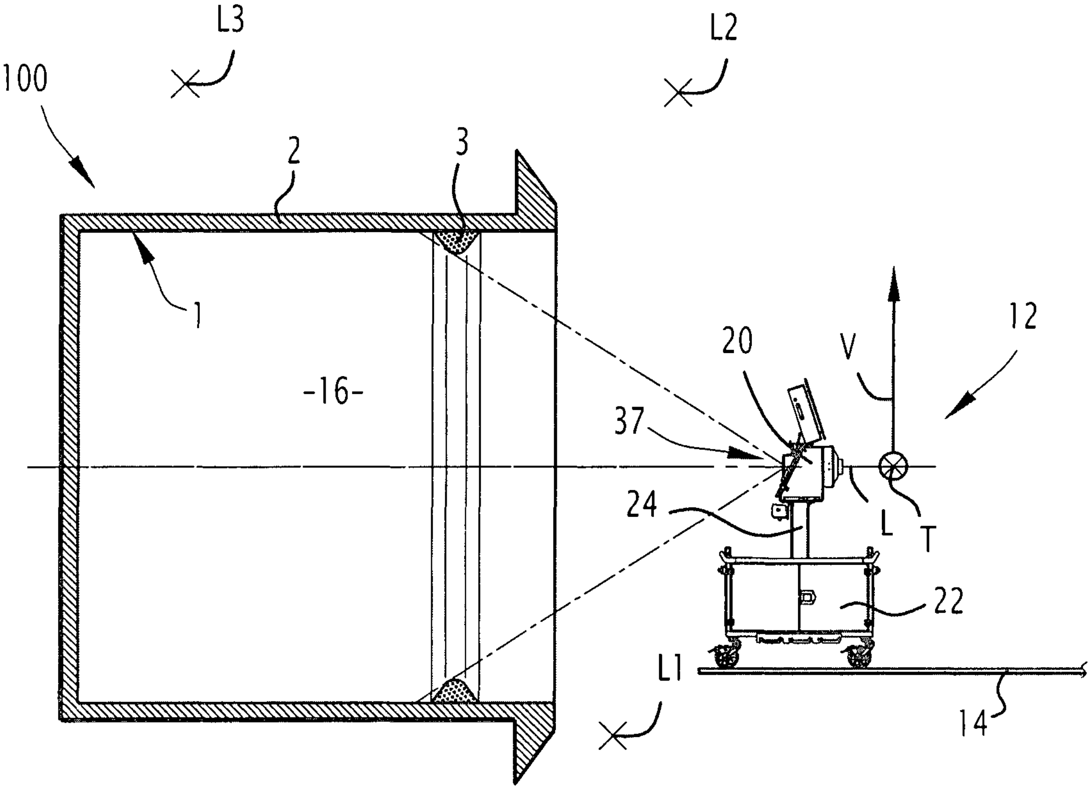
FIG. 7 is a schematic view of a variant of the installation shown in FIGS. 1 and 2.

An installation 100 according to a variant of the invention will now be described with reference to FIG. 7. The installation 100 is analogous to the installation 10 shown in FIGS. 1 to 4, and 6. Similar elements bear the same numeral references. Only the differences will be described in detail.

In the installation 100, the receptacle 2 is still for example a ladle, but in a different position. The ladle lies on its side, so that its symmetry axis is approximately horizontal. The arm 24 of the device extends along the vertical direction V.

For example, compared with the configuration shown in FIGS. 1 and 3, the arm 24 has been rotated around the transverse direction T with respect to the base 22. The front face 37 of the box 20 faces the ladle horizontally in this example. This provides the device 12 with flexibility, as the device is suitable for scanning a receptacle from above or from aside.

The use and the advantages of the installation 100 are similar with those of the installation 10.

An installation 200 according to a second embodiment of the invention will now be described with reference to FIG. 8. The installation 200 is analogous to the installation 100 shown in FIG. 7. Similar elements bear the same numeral references. Only the differences will be described in detail.

The installation 200 comprises a receptacle 202 which is an electric arc furnace having a refractory lining 201, and a door 203.

The device 12 is in the same configuration as represented in FIGS. 1 and 2, with the arm 24 extending along the longitudinal direction L (horizontally), so that the box is located inside the furnace.

The use and the advantages of the installation 200 are similar with those of the installations 10 and 100, with the following differences.

Prior to use, the device 12 is moved on the floor 14 in order to introduce the box 20 within the receptacle 202 via the door 203. Then scanning is performed in the same way as previously described, with the same results and advantages.

In particular, the device 12 allows scanning zones that would be grey for the first laser scanner 21A.

Figure 8:
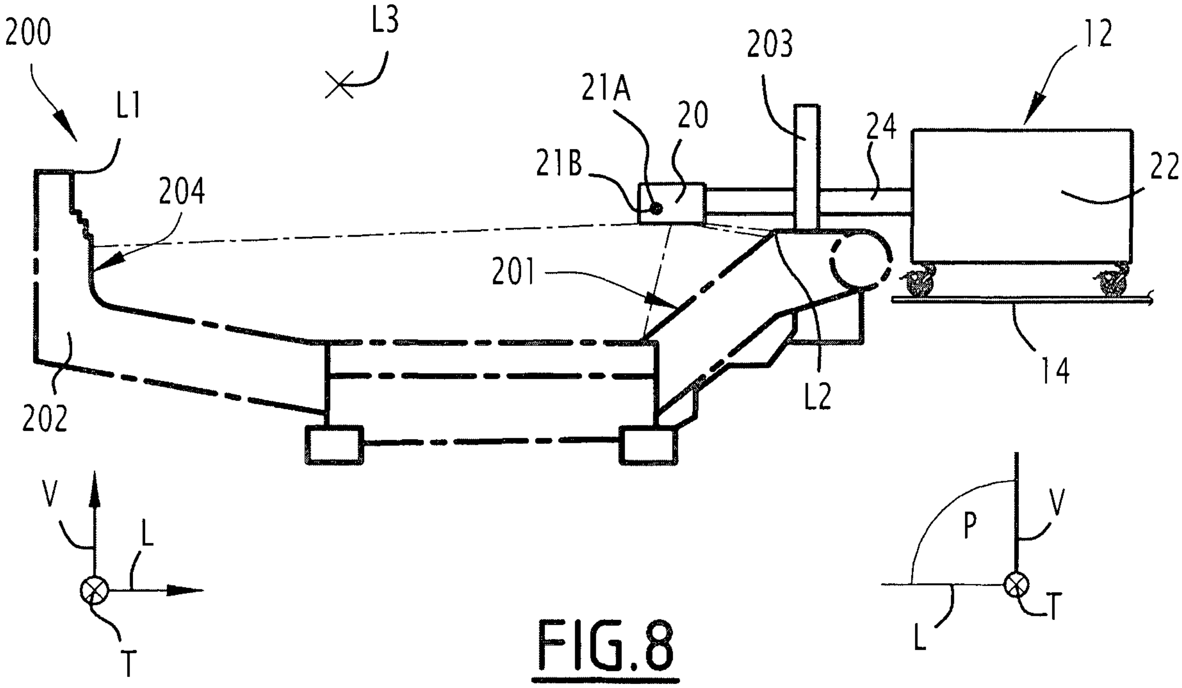
FIG. 8 is a schematic view of an installation according to a second embodiment of the invention.
Figure 9:
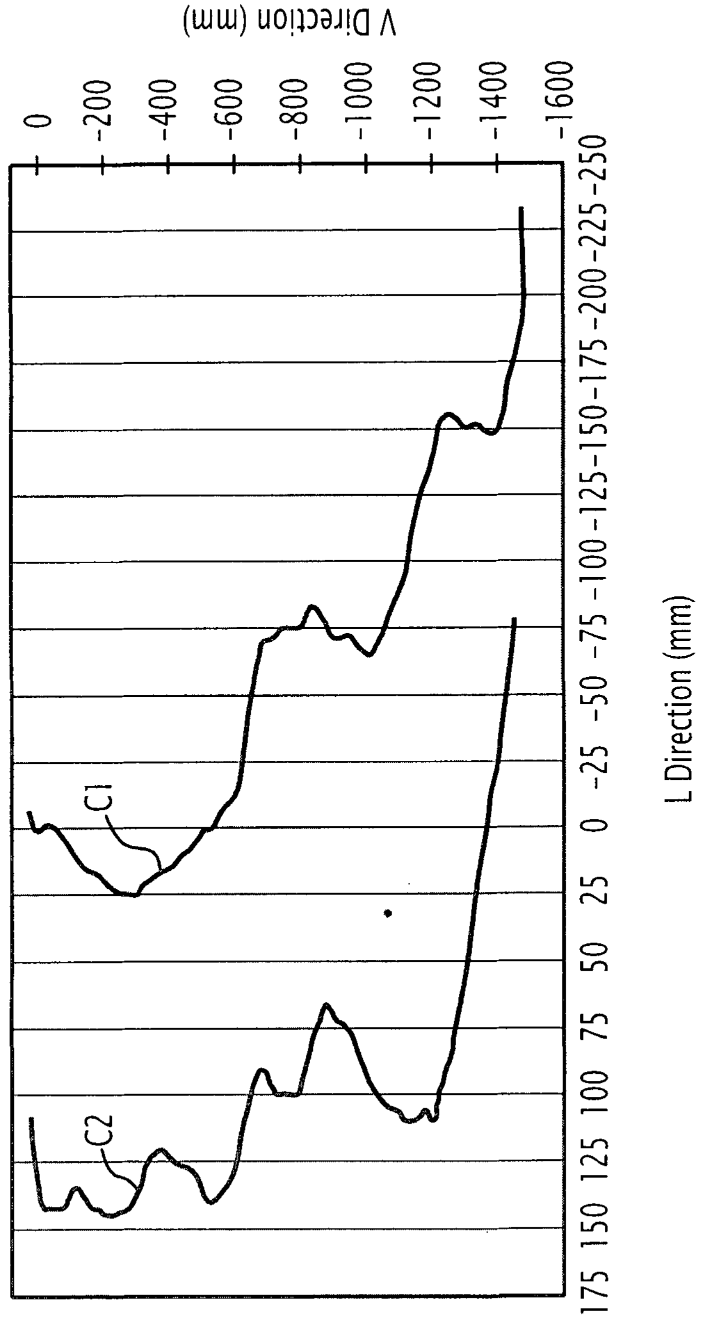
FIG. 9 is a graph showing two refractory lining profiles obtained from the installation shown in FIG. 8.

In the graph show in FIG. 9, a curve C1 is an example of a profile which was obtained from a final set of data provided by the device 12 after scanning the electric arc furnace shown in FIG. 8. The profile is taken in a plane P which is perpendicular to the transverse direction T. Curve C1 represents a vertical profile of a lateral wall 204 of the receptacle 202.

After a few weeks, a second curve C2 was obtained in the same manner. The difference between the curves C1 and C2 shows in a very accurate manner how the wall 204 has worn off.

What is claimed is:

1. A process for measuring wear of a refractory lining of a receptacle intended to contain molten metal, the process comprising the following steps:

scanning a first surface of the refractory lining using a first laser scanner in order to obtain a first initial set of data representative of the first surface, scanning a second surface of the refractory lining using a second laser scanner, separate from the first laser scanner and spaced apart from the first laser scanner, in order to obtain a second initial set of data representative of the second surface, wherein the second surface includes a grey zone for the first laser scanner, the receptacle having an obstacle located between the first laser scanner and the grey zone so as to obscure a view of the grey zone by the first laser scanner during the scanning of the first surface by the first laser scanner, calculating a final set of data using the first initial set of data and the second initial set of data, the final set of data being representative of a surface of the refractory lining including the first surface and the second surface, and measuring wear of the refractory lining using the final set of data.

2. The process according to claim 1, wherein the receptacle is a ladle, an electric arc furnace or a converter.

3. The process according to claim 1, wherein said scanning of the first surface and said scanning of the second surface are simultaneous.

4. The process according to claim 1, comprising:

fixing a base of the first laser scanner and a base of the second laser scanner on a support frame, wherein the bases are fixedly spaced apart along a transverse direction of the support frame, and keeping the support frame in a fixed position with respect to the receptacle during scanning of the first surface and the second surface.

5. The process according to claim 4, wherein said scanning of the first surface and of the second surface comprises:

emitting a laser beam using a laser beam emitter, receiving a reflected laser beam from the refractory lining using a laser beam receiver, measuring a transit time between emission of the laser beam and reception of the reflected laser beam, and deflecting the emitted laser beam in two mutually perpendicular directions.

6. The process according to claim 5, wherein said deflecting the emitted laser beam includes rotating a mirror about a first rotation axis with respect to the laser beam emitter, and rotating the laser beam emitter about a second rotation axis with respect to the base.

7. The process according to claim 4, wherein said calculating the final set of data includes using parameters representative of a position of the base of the second laser scanner with respect to the base of the first laser scanner.

8. The process according to claim 1, wherein said calculating the final set of data includes detecting at least three points within the first initial set of data and three additional points within the second initial set of data, the three points and the three additional points being representative of three landmarks within or around the surface.

* * * * *